United States Patent Office 2,851,735
Patented Sept. 16, 1958

2,851,735
METHOD OF PREPARING MOLDED ARTICLE FROM VINYL CHLORIDE POLYMER AND A POLYAMIDE

Wilfrid Henry Hogg, Sutton Coldfield, and Wyndham Mobberley, Bournville, Birmingham, England, assignors to Dunlop Rubber Company Limited, County of London, England, a British company No Drawing. Application October 7, 1955
Serial No. 539,235

Claims priority, application Great Britain October 14, 1954

3 Claims. (Cl. 18—58)

This invention relates to resin compositions, especially compositions containing resins based on vinyl chloride.

In the production of molded articles consisting of or coated with polyvinyl chloride compositions a disadvantage which often arises is that, owing to the thermoplastic nature of the compositions, they must be cooled before removal from the mould or press; this entails considerable waste of time and heat. This disadvantage is not limited to the production of articles by moulding operations, but extends to many other applications of polyvinyl chloride compositions in which their thermoplasticity is helpful in the production of the articles but undesirable in the articles themselves. Many advantages would accrue if such compositions could be prepared with useful thermosetting properties.

Our invention provides novel compositions containing resins based on vinyl chloride which shall have useful thermosetting properties.

According to our invention, a thermosetting composition comprises a resin based on vinyl chloride and an amide having more than one available amino group in the molecule. In many cases a plasticizer is also included in the composition, but in some other cases, exemplified below, the composition may contain no plasticizer of the ordinary kind and may not even contain a plasticizer of any kind.

The invention also includes a method of preparing an article composed, at least in part, of a resin based on vinyl chloride which comprises heating a composition of the above type in a mould to a temperature at which thermosetting takes place and removing the article from the mould before any substantial reduction in the temperature of the article has occurred.

The thermosetting compositions of the invention may take any of a number of forms. One form consists of a dispersion of a resin based on vinyl chloride in a plasticizer in which an amide has been incorporated; such a dispersion constitutes a plastisol having an amide in its plasticizer. The dispersion may be of the type in which substantially none of the vinyl resin is dissolved in the plasticizer, and in this case is prepared by simple mixing of a paste-making form of the vinyl resin with the plasticizer in the cold, the amide being either mixed with the plasticizer previously or mixed into the plastisol subsequently. The paste-making form of resin is a known suitably-graded form of small particle size, which is in common use for the preparation of plastisols.

A dispersion of the first type is relatively free-flowing. If the dispersion is to be used in the form of a plastic mass, e. g. as a composition of consistency comparable to that of masticated uncured rubber, it may instead have a substantial proportion of its vinyl resin dissolved in the plasticizer; such a composition may be prepared by dissolving the proportion of vinyl resin in question in the plasticizer at a suitable elevated temperature, cooling, and then adding the remainder of the vinyl resin. The amide is introduced subsequently to the stage of dissolving part of the vinyl resin in the plasticizer.

Another form of composition in accordance with the invention may be prepared by first mixing together on a heated mill a resin based on vinyl chloride and a plasticizer or plasticizers so chosen in respect of type and proportion that the homogeneously mixed composition is workable at comparatively low temperature, i. e. temperatures at which the amide can be incorporated without danger of premature thermosetting taking place. The amide is then added to the plastic mass on a suitable roller mill or in an internal mixer. In order to assist in achieving the desired conditions of temperature and plasticity, or to modify the properties of the final product, plasticizers of the ordinary kind may be replaced partly or wholly by a compatible or partially compatible synthetic rubber, such as chloroprene or a copolymer of butadiene with styrene, with acrylonitrile, or with methyl isopropenyl ketone.

A further form of composition in accordance with the invention is a thermosetting adhesive or cement consisting of a solution of a resin based on vinyl chloride, with or without a plasticizer for this resin, and an amide, in an organic solvent of appropriate polarity and volatility, such as a ketone having about six carbon atoms in the molecule, e. g. methyl isobutyl ketone. Similar solutions may be extruded through suitable nozzles into a drying chamber and the resulting fibres cured by heat, with or without stretching, to yield textile fibres.

The amides that may be used in the present compositions should have more than one available amino group in the molecule and may be derived, for example, from unsaturated dibasic acids and ammonia or amines. The preferred acids are the unsaturated dibasic aliphatic carboxylic acids having a long chain in the molecule, e. g. a chain containing ten or more carbon atoms. The di-olefinic acids such as dilinoleic acid are especially suitable. The preferred amines are the primary amines such as the alkylene polyamines, especially those containing a lower alkylene group, e. g. ethylene diamine. The polyamide resins made by reacting di-linoleic acid with ethylene diamine, are of particular value. In physical form the polyamide resins may range from sticky liquids to hard solid resins, according to the conditions of preparation.

The weight of polyamide resin used is preferably between 1% and 15% of the weight of the vinyl resin. Thus the weight used of a resin derived from di-linoleic acid and ethylene diamine may suitably be between 5% and 10% of the weight of the vinyl resin.

The resins based on vinyl chloride which may be used in this invention include polyvinyl chloride and copolymers of vinyl chloride with other unsaturated compounds, such as vinyl esters of organic acids, e. g. vinyl acetate, or with vinylidene compounds such as vinylidene chloride. Other copolymers which may be used include copolymers of vinyl chloride with butadiene, chloroprene, isoprene, and acrylonitrile.

Any of the plasticizers ordinarily used with these vinyl resins, such as di-octyl phthalate and tri-cresyl phosphate, may be used in the present compositions; however, there are, as already indicated, certain cases in which no plasticizer at all is needed, and certain cases in which use may be made of a special kind of plasticizing material, such as the synthetic rubbers specified in connection with those of the present compositions which may be prepared on the mill.

Pigments, fillers, stabilizers and the like may be incorporated in the compositions of the invention if desired.

The time and temperature to which the compositions must be heated for thermosetting to be effected varies according to the proportion and type of amide used, but in typical cases the heating conditions may range from 60 minutes at 140° C. to 10 minutes at 180° C.

The thermosetting compositions of the invention can be used for a variety of purposes. As already indicated, they may take the form of relatively free-flowing dispersions or plastisols, e. g. heterogeneous fluids or pastes, and in this case they can therefore be injected into moulds or applied as surface coats at ordinary temperatures and will retain their fluid or paste-like nature until heated to the temperature at which the vinyl resin and plasticizer homogenize. Examples of applications for which these forms of thermosetting composition are suitable are the manufacture of belting by coating a fabric reinforcement, the proofing of fabrics, and the manufacture of slush-moulded, dipped or press-moulded articles. The moulding process may be compared to the vulcanization of a rubber product, but it may be pointed out that those of the present thermosetting dispersions or plastisols which are liquid or semi-liquid can be introduced into the mould much more easily than can a rubber or synthetic rubber mixing. A convenient arrangement is to inject the composition into the closed mould from a simple cylinder and piston assembly, or from some other pressure device which can be either attached to the mould permanently or brought up to it for the duration of the injection period. No heavy or heated machinery is necessary for mixing the composition, and the preparation of a preform, e. g. by calendering or extruding, prior to moulding, is completely avoided.

The present thermosetting dispersions or plastisols are particularly well suited to the production of coated fabrics where the thermoplasticity of a normal polyvinyl chloride compound may be a disadvantage. The fabric may be coated by a normal spreading operation followed by a radiant-heat thermosetting process.

An embossed pattern can be applied by passing the material round a heated engraved roller, thermosetting taking place simultaneously. Alternatively, by using the less free-flowing plastisols or plastic masses already referred to, or the compositions which may be prepared on the mill, already referred to, the embossed pattern can be applied in the cold and the material heated subsequently to complete the process.

Extrusion processes starting with the pumping of a semi-liquid paste through a heated suitably-shaped die are also possible using the present free-flowing thermosetting compositions. Thermosetting during the heating process renders unnecessary the rather elaborate arrangements which in processes using thermoplastic material are often required for handling the thermoplastic extrusion while it is cooling.

The present free-flowing thermosetting dispersions can be extruded in the cold to produce a section which will undergo the thermosetting process without distortion if certain stiffening agents such as bulky powders (e. g. a finely divided silica) are incorporated in them; this addition enables the composition to take a moulded shape or an embossed shape or an embossed pattern in the cold and to retain this form during a subsequent heating process. Such stiffened dispersions may also be used in the preparation of an embossed sheeting for shoe soling and like applications.

Cellular products can be made by incorporating blowing agents in the present thermosetting dispersions, such products having improved physical properties, particularly when hot, as compared with straight plasticized polyvinyl chloride compositions. Instead of being generated by chemical blowing agents, a gas such as carbon dioxide or nitrogen may be dissolved or dispersed in the compositions under pressure as such, with or without simultaneous mechanical working. On releasing the pressure under controlled conditions, the compositions expand to a foam which is subsequently heated in an oven or by high-frequency methods to homogenize and thermoset the vinyl composition. Thickening and structure-forming substances may when necessary be added to the vinyl compositions in order to prevent premature collapse of the foam before or during heating.

Tanks and other vessels may be lined for protection against corrosion or other deleterious chemical action by means of thermosetting dispersions prepared according to the present invention. The dispersion is trowelled on to the surfaces in question and subsequently heated to homogenize and thermoset the composition.

Those of the present dispersionsions which are less free-flowing, and also the forms of thermosetting composition which may be prepared on the mill, can be used quite generally in the same way as known thermosetting resins in moulding, coating and like processes, and can be calendered on to cords and textile fabrics as in the case of rubber. They can also be used for the applications mentioned above in connection with the compositions obtained by incorporating stiffening agents in the relatively free-flowing dispersions.

Compositions made in accordance with the present invention, like other thermosetting vinyl resin compositions, have the advantage over ordinary thermoplastic vinyl resins that mouldings made with them can safely be removed from their moulds without delay. This is an advantage which is of particular importance in the case of cellular products, since when these products are made from thermoplastic compositions they are found to be particularly liable to distortion if removed from the mould prematurely. In addition, however, the present compositions have advantages not given by some of the previously proposed thermosetting vinyl resin compositions, in that they are substantially odourless and non-irritant, and in that they do not discolour seriously when thermoset, so that by the use of suitable pigments coloured final products can be obtained which are of attractive light shades.

The following examples illustrate the invention, all parts being by weight. In these eramples the resin described as Geon 121 is a polyvinyl chloride powder of a type suitable for the production of plastisol pastes and the resin described as polyamide resin is a polyamide resin derived from dilinoleic acid and ethylene diamine.

EXAMPLE I

A dispersion or paste was obtained using a powdered polyvinyl chloride resin available commercially under the name Geon 121. The composition of the paste was as follows, the proportions given being by weight:

| | Parts |
|---|---|
| Geon 121 | 100 |
| Di-octyl phthalate | 60 |
| Lead carbonate | 5 |
| Polyamide resin | 5 |

The polyamide resin, which was a resin of high viscosity, was dissolved in the di-octyl phthalate plasticizer. The polyvinyl chloride and the lead carbonate stabiliser were added, the paste was passed through a triple roller mill at room temperature to ensure complete dispersion of the polyvinyl chloride, and then the paste was spread into a mould and the mould heated to 160° C. for 15 minutes. After this thermosetting treatment the composition was found to be capable of being stripped from the mould whilst hot without distortion.

EXAMPLE II

This illustrates the preparation of a chemically blown sponge material. A plastisol having the following composition was prepared:

| | Parts |
|---|---|
| Geon 121 | 100 |
| Dioctyl phthalate | 60 |
| Tricresyl phosphate | 60 |
| Basic lead phosphite | 2 |
| Lead silicate | 2 |
| Polyamide resin | 12 |
| pp'-Oxy-bis (benzene sulphonyl hydrazide) | 12 |

The ingredients were mixed by stirring together and passing through a paint mill. A volume of the mixture equal to one third that of the mould cavity was poured into a suitable mould, which was then closed with a perforated lid and heated for 20 minutes at 160° C. The mould was then opened and the expanded product extracted while still hot. The product retained its shape on cooling.

EXAMPLE III

*High pressure gas-blown sponge*

| | Parts |
|---|---|
| Geon 121 | 100 |
| Dioctyl phthalate | 85 |
| Polyamide resin | 10 |
| Dibutyl tin di-laurate | 2 |

A plastisol having the above composition was mixed as in Example II and agitated in a pressure vessel under carbon dioxide at 400 to 600 lbs. per sq. in. The mixture of liquid and gas was allowed to foam by discharging it through a suitable nozzle into a mould, and was then heated in an oven for 20 minutes at 160° C. The vulcanized foam was then stripped from the mould without appreciable cooling. It retained its shape and structure on cooling.

EXAMPLE IV

*Slush moulding*

| | Parts |
|---|---|
| Geon 121 | 100 |
| Dioctyl phthalate | 80 |
| Dibutyl tin dilaurate | 3 |
| Lead stearate | 0.5 |
| Polyamide resin | 10 |

The above composition was mixed to a plastisol as in Example II. A suitable light section hollow mould was heated to 100° C. and the plastisol was poured into it. After standing for 15 seconds, the mould was inverted and the un-gelled paste allowed to flow into a cooled container for re-use. A film of approximately 1/16 inch of gelled material remained on the inner surface of the mould, which was then heated for 10 minutes at 170° C. The vulcanized inner skin of polyvinyl chloride resin was stripped away from the mould and allowed to cool, giving the finished hollow product.

EXAMPLE V

Two compounds were prepared as follows:

*Compound A.*—33 parts of Geon 121 were stirred into a mixture of 22.4 parts of tricresyl phosphate, 30 parts of dioctyl phthalate and 0.6 part of lead stearate (heat stabiliser) which had been heated to 150° C. After the polyvinyl chloride had been stirred in and allowed to dissolve the mixture was cooled.

*Compound B.*—A composition was prepared from 9 parts of "Polysar NP 450" (a copolymer of butadiene and acrylonitrile), 27 parts of "Geon 121" and 6 parts of tricresyl phosphate. The "Polysar" was lightly masticated on a cold roller mill and the "Geon 121" mixed in, followed by the plasticiser.

A and B above were then mixed with other ingredients as follows:

| | Parts |
|---|---|
| Compound A | 86 |
| Compound B | 42 |
| Geon 121 | 40 |
| Lead phosphate | 3 |
| Lead silicate | 3 |
| Litharge | 1 |
| Dibenzthiazyl disulphide | 0.3 |
| Sulphur | 0.3 |
| Red iron oxide | 1.7 |
| Polyamide resin | 14.0 |
| | 183.3 | to give an ultimate composition of:

| | Parts |
|---|---|
| Polyvinyl chloride | 100 |
| Dioctyl phthalate | 30 |
| Tricresyl phosphate | 28.4 |
| Polysar NP 450 | 9 |
| Lead phosphate | 3 |
| Lead silicate | 3 |
| Lead stearate | 0.6 |
| Litharge | 1.0 |
| Red oxide | 1.7 |
| Dibenzthiazyl disulphide | 0.3 |
| Sulphur | 0.3 |
| Polyamide resin | 14.0 |
| | 183.3 |

The resulting composition was a vulcanisable dough which could be milled and calendered on ordinary rubber processing machinery at temperature well below the vulcanising temperature. The composition could also be extruded into long lengths of any desired cross-section.

Having now described our invention—what we claim is:

1. A method of preparing a molded article which comprises heating in a mold to a temperature of 140° C. to 180° C. a mixture of a resinous polymer of vinyl chloride and 1 percent to 15 percent of its weight of an amide of dilinoleic acid and an alkylene polyamine, said amide having in the molecule more than one member selected from the class consisting of primary and secondary amino groups, and removing the article from the mold before any substantial reduction in the temperature of the article has occurred.

2. A method according to claim 1 wherein the alkylene polyamine is ethylene diamine.

3. A method of preparing a molded article which comprises heating in a mold to a temperature of 140° C. to 180° C. a mixture of a resinous polymer of vinyl chloride and 1 percent to 15 percent of its weight of an amide of a di-olefinic dicarboxylic acid having a chain in the molecule containing at least 10 carbon atoms and an alkylene polyamine, said amide having in the molecule more than one member selected from the class consisting of primary and secondary amino groups, and removing the article from the mold before any substantial reduction in the temperature of the article has occurred.

References Cited in the file of this patent

UNITED STATES PATENTS

| 2,685,534 | Kling | Aug. 3, 1954 |
| 2,723,208 | Morrison | Nov. 9, 1955 |
| 2,728,737 | Wittcoff | Dec. 27, 1955 |